April 13, 1971           L. HINDS ET AL          3,574,802
PROCESS FOR THE PRODUCTION OF FOAMED SLABS AND LAMINATES WHILE
CONTINUOUSLY SENSING AND ADJUSTING THE WIDTH OF THE SLAB
Filed Oct. 21, 1968
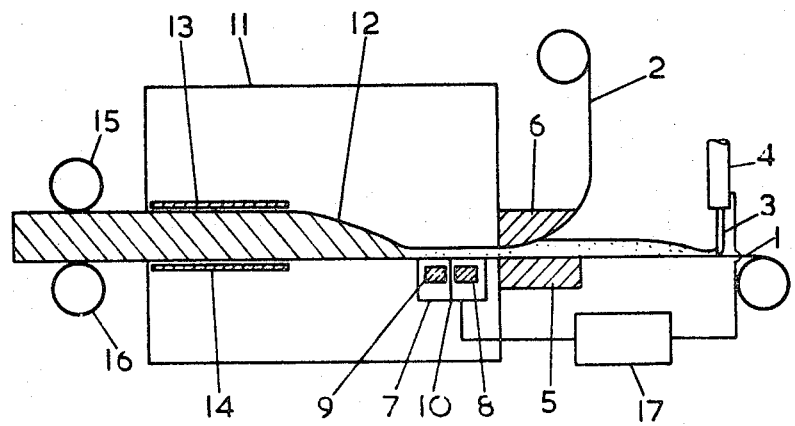
INVENTORS
LESLEY HINDS
DAVID ROBIN LANDER

United States Patent Office 3,574,802
Patented Apr. 13, 1971

3,574,802
PROCESS FOR THE PRODUCTION OF FOAMED SLABS AND LAMINATES WHILE CONTINUOUSLY SENSING AND ADJUSTING THE WIDTH OF THE SLAB
Lesley Hinds, Welwyn Garden, and David Robin Lander, Shillington, near Hitchin, England, assignors to Imperial Chemical Industries Limited, London, England
Filed Oct. 21, 1968, Ser. No. 769,340
Claims priority, application Great Britain, Oct. 23, 1967, 48,094/67
Int. Cl. B29d 27/04
U.S. Cl. 264—47                             9 Claims

ABSTRACT OF THE DISCLOSURE

A process for the production of foam synthetic plastic materials optionally provided with a facing sheet on one or more surfaces which comprises depositing a foamable composition onto a carrier web, applying a second web above and in contact with the deposited foamable composition, passing the sandwich thus produced through a metering slit which produces a controlled distance between the webs, sensing the width of the foamable composition subsequent to its passage through said slit then adjusting the rate of depositing of said foamable composition in response to the sensed width and heating to foam and set the deposited layer.

---

According to the present invention we provide a process for the production of foamed synthetic plastic materials optionally provided with a facing sheet on one or more surfaces in which a foamable composition is deposited by adjustable feed means onto a carrier web to form a layer and a second web is applied above and in contact with the layer of the foamable composition, and the sandwich thus produced is passed through a metering slit and then heated to foam and set the foamable composition, in which adjustment of said feed means is controlled by a device which senses the width of the foamable composition between the two webs subsequent to its passage through the metering slit and in response to said sensing the feed means is adjusted such that the amount of foamable composition that is deposited on the carrier web is sufficient to maintain said width at a desired value.

This invention is particularly well suited to the production of thermoset resin foamed materials. Examples of thermosetting resins which may be used in the present invention include the foamable polyurethanes, the condensates of amine containing compounds such as urea, thiourea, guanidine or melamine with formaldehyde or any of the phenol formaldehyde condensation resins. These resins will harden to produce a rigid structure when heated and in some instances heating alone will be sufficient to harden the resin. However, this hardening may be accelerated by introducing a catalyst to the resin; examples of suitable catalyst are the strong acids such as sulphuric acid, hydrochloric acid and oxalic acid and also basic substances such as sodium hydroxide and potassium hydroxide. Our preferred method of hardening the resin is to introduce an acid catalyst to the resin and simultaneously to heat the resin. Foams are conveniently produced from these resins by incorporating a foaming agent that produces a gas when heated into the resin which is then deposited on the carrier web optionally in the presence of a hardening agent. The foaming may then be effected by heating the web which also causes the thermosetting resin to harden. Examples of such foaming agents include water, the low boiling organic liquids such as pentane and other hydrocarbons and halohydrocarbons.

Our preferred resin comprises a phenol formaldehyde condensation resin from which the foam is produced by mixing a partially condensed resin with a foaming agent, our preferred agent being pentane, and introducing this mixture to an acid catalyst in a mixing head or a spray gun or a dispensing nozzle, and then ejecting the mixture onto the carrier web. The acid catalyst which may be any strong acid, conveniently hydrochloric acid, catalyses the further condensation and hardening of the partially condensed phenol formaldehyde resin. This further condensation is an exothermic reaction and the heat given off may be sufficient to vaporise the foaming agent which will thus foam the resin. If, however, the heat due to this exotherm is not sufficient to vaporise the foaming agent further heat should be applied. This further heat may be supplied by passing the resin/web sandwich through an oven and/or by heating the carrier web.

The carrier web and/or the second web may if desired be stripped from the surface of the foamed structure after the resin has foamed and set or the webs may be left adhering to the surface to provide a laminate. Both webs are preferably of flexible material and examples of suitable webs are thermoplastic films such as polyethylene, polypropylene, polyethylene terephthalate, polystyrene and vinyl chloride polymer films, paper, plastic coated paper and metal foils such as aluminium foil. If the webs are to be stripped from the foamed structure they may conveniently be continuous bands, and in this case they may be coated with a material such as polytetrafluoroethylene which facilitates their removal from the foamed structure. However, if a laminate is being produced, the webs may conveniently be impregnated or coated with a material that improves the adhesion of the web to the foamed structure. For example, if an acid hardenable foamable composition is used the web may conveniently be coated with an acid hardenable resin so that as the foamable composition hardens, the coating on the web also hardens, thus effecting a strong bond between the foam and the web.

The metering slit used in this process may conveniently comprise two rollers which form a nip through which the sandwich passes. One of the metering rolls is preferably stationary and the other is movable towards and away from the stationary one, thus altering the thickness of the slit.

Alternatively the metering slit may comprise a variable width slot die having die lips movable towards and away from each other, preferably with the die lips shaped so that the slot is wider at its edges than at its centre. When using a slot die which is wider at its edges the resin will be spread out between the carrier webs as it passes through the slot thus counteracting the effect of uneven distribution of the material deposited on the webs.

For a constant metering slit height and constant rate of deposition of the resin as the haul-off rate, i.e. the rate of movement of the carrier webs, increases, the width of the foamable composition passing through the slit will decrease and thus it is necessary to deposit more of the foamable composition on the carrier web to maintain the required width of resin between the webs after they have passed through the slits. Accordingly, by the process of this invention, to ensure that there is sufficient foamable material in front of the slit to provide a constant width of resin between the webs after their passage through the slit, the width of the resin between the webs is sensed after it has passed through the metering slit and this information relayed to the source of the foamable material and the rate at which the foamable material is deposited is adjusted accordingly.

The width of the foamable resin between the webs may be sensed in any suitable manner. One convenient method is to pass one or both edges of the sandwich comprising the resin between the webs between two electrodes; variation in the width of the resin will then cause variations in the capacitance between the electrodes. These electrodes are then connected in an electrical circuit to an instrument which converts the capacitance variation into an electric signal which is relayed to the source of foamable material and the rate at which the foamable composition is deposited on the web is adjusted accordingly.

Alternatively and more conveniently, the two electrodes may be placed side by side above or below the webs so that when an alternating current is supplied to these electrodes the resin/web sandwich lies within the electric field set up between the electrodes. Preferably the electrodes extend some distance under the webs so that the capacitance between the electrodes depends upon the position of the resin between the webs with respect to the electrodes. Here again the electrodes will be connected in an electrical circuit to an instrument which converts the capacitance variation into an electric signal which is relayed to the source of the foamable composition and the rate at which the foamable composition is deposited on the web adjusted accordingly.

Alternatively, if the webs are of transparent material, a beam of light may be used to determine the width of the resin. The beam is directed at the edge of the web and the amount of light passing through the webs is measured with a photocell. The amount of light passing through the webs gives an indication of whether or not there is any foamable material between the webs at the point where the light beam passes therethrough. This information is then relayed to the source of foamable material and the rate at which the material is deposited is adjusted so that the extremity of the foamable material between the webs is at the position of the light beam.

In a further embodiment of the present invention the position of both edges of the resin between the webs is sensed and this information used to centrallise the position of the source of the resin above the web so that the resin will extend equally on either side of the centre of the web. Simultaneously the position of the edges of the resin is relayed to the source of the resin and the rate at which the resin is deposited is adjusted so as to maintain it at the required width.

The process of the present invention is illustrated but in no way limited by reference to the accompanying drawings in which:

FIG. 1 illustrates an apparatus for carrying out the process for forming laminates according to the present invention.

In the process illustrated in FIG. 1 a lower carrier web 1 is fed beneath an adjustable nozzle 4 which deposits foamable resin 3 onto the web. A second carrier web 2 is then introduced above the resin and the sandwich so produced passes through the slit defined by members 5 and 6 which spread the resin across the webs. The sandwich then passes into an oven 11 containing heaters (not shown) where it passes over the width sensing device 7 which comprises two electrodes 8 and 9 separated by a plate 10, an alternating current is applied across the electrodes so that the field between the two extends into the sandwich. The capacitance between the two electrodes is determined (by means not shown) and relayed to an instrument (illustrated by numeral 17) which converts the information to an electrical signal indicating the position of the edge of the resin; this signal is then relayed to the source of the resin 4 and the rate of deposition of the resin 3 adjusted accordingly. After passing over the width sensing device 7 the resin foams in the region 12; the final thickness of the foam is controlled by load bearing platens 13 and 14. The laminate is finally withdrawn from the oven by haul-off rolls 15 and 16.

If desired a device which senses the thickness of the foam may also be used in conjunction with the width sensing means of the present invention. The depth of the metering slit is then automatically adjusted according to the thickness of foam that is being produced so that foamed articles of the required thickness are produced. Thus, by using a thickness-sensing and a width-sensing device in combination the depth of the metering slit may be adjusted to produce laminates or panels of the required thickness and, as this depth is altered, the rate of deposition of the resin will be automatically adjusted so as to maintain the width of resin subsequent to its passage through the metering slit constant whatever the depth of the slit.

We claim:

1. A process for the production of foamed synthetic plastic materials which comprises depositing a foamable composition selected from the group consisting of polyurethanes, urea formaldehyde, guanidine formaldehyde, thiourea formaldehyde, melamine formaldehyde and phenol formaldehyde onto a carrier web to form a layer, applying a second web above and in contact with the deposited layer of the foamable composition, passing the sandwich thus produced through a metering slit which provides a controlled distance between said webs, heating the deposited layer to foam and set the foamable composition, sensing the width of the foamable composition between the two webs subsequent to its passage through said slit and adjusting the rate of depositing of said foamable composition in response to the sensed width of the foamable composition so that the amount of foamable composition that is deposited on the carrier web is sufficient to maintain said width at a desired value.

2. A process according to claim 1 in which the sandwich is heated by passage through an oven.

3. A process according to claim 1 in which one or both of the webs is or are stripped from the surface of the foam after the synthetic plastic material has foamed and set.

4. A process according to claim 3 in which at least one of the webs is a continuous band.

5. A process according to claim 1 in which the metering slit comprises the gap between a pair of rollers.

6. A process according to claim 1 in which the metering slit comprises a variable width slot which is wider at its centre than at its edges.

7. A process according to claim 1 in which the width of the foamable composition between the webs is sensed by passing one or both edges of the sandwich between two electrodes and determining the capacitance between the electrodes.

8. A process according to claim 1 in which the width of the foamable composition between the webs is sensed by passing one or both edges of the sandwich above or below two electrodes so that when alternating current is supplied to these electrodes the sandwich lies within the electric field set up and determining the capacitance between the electrodes.

9. A process according to claim 1 in which the webs are of transparent material and the width of the resin between the webs is sensed by a beam of light.

References Cited

UNITED STATES PATENTS

| | | | |
|---|---|---|---|
| 2,804,592 | 8/1957 | Biskeborn | 264—40X |
| 2,820,987 | 1/1958 | Bunch | 264—47X |
| 3,123,856 | 3/1964 | Dye | 264—47X |
| 3,159,786 | 12/1964 | Bayne | 264—40X |
| 3,166,454 | 1/1965 | Voelker | 264—47X |
| 3,233,576 | 2/1966 | Voelker | 264—47X |

DONALD J. ARNOLD, Primary Examiner

P. A. LEIPOLD, Assistant Examiner

U.S. Cl. X.R.

18—2, 4; 264—47, 51